United States Patent [19]

Sasaki

[11] 4,046,637
[45] Sept. 6, 1977

[54] DISTILLATORY APPARATUS

[75] Inventor: Shosuke Sasaki, Amagasaki, Japan

[73] Assignees: Shosuke Sasaki, Tokyo; Sasaki Takashi, both of Japan

[21] Appl. No.: 668,117

[22] Filed: Mar. 18, 1976

[30] Foreign Application Priority Data

Mar. 20, 1975  Japan .................................. 50-33691

[51] Int. Cl.² ............................................. B01D 3/02
[52] U.S. Cl. ................................ 202/174; 202/185 R; 203/DIG. 17
[58] Field of Search .............. 159/17 PC, 13 B, 17 C; 202/174, 185 R, 160; 203/12, DIG. 17

[56]  References Cited
U.S. PATENT DOCUMENTS

| 945,640 | 1/1910 | Thelen | 159/13 B |
| 1,390,677 | 9/1921 | Bavfre | 159/17 P |
| 2,863,808 | 12/1958 | Markels | 159/13 L |
| 3,004,590 | 10/1961 | Rosenblad | 159/13 B |
| 3,099,607 | 7/1963 | Lustenader | 159/17 P |
| 3,275,530 | 9/1966 | Akers | 159/13 B |
| 3,941,663 | 3/1976 | Steinbruchel | 159/17 R |

Primary Examiner—Hiram H. Bernstein
Attorney, Agent, or Firm—Pollock, Vande Sande & Priddy

[57] ABSTRACT

Disclosed is a distillatory apparatus in which distilling chambers are disposed in array and the atmospheric pressures in the distilling chambers are selected to gradually lower in the order of them and maintained at such gradually decreased values. The distilling chambers are each supplied with an original liquid. The original liquid supplied to each distilling chamber flows on a partition wall between the distilling chamber and the adjacent one of higher atmospheric pressure. While flowing on the partition wall, the original liquid is heated to be evaporated and vapor makes contact with a partition wall on the side of the adjacent distilling chamber of lower atmospheric pressure and is cooled thereby to be condensed to a distilled liquid. The atmospheric pressures of the distilling chambers are selected so that, by the heat released by the condensation of the vapor in each distilling chamber, the partition wall is heated and that the original liquid in the adjacent distilling chamber of lower atmospheric pressure is evaporated by the heat of the partition wall. The original liquid supplied to each distilling chamber is heat exchanged with the distilled liquid and the remaining original liquid, that is, a concentrated liquid, drained out from the distilling chamber.

9 Claims, 8 Drawing Figures

DISTILLATORY APPARATUS

BACKGROUND OF THE INVENTION

This invention relates to distillatory apparatus for distilling a liquid to purify it, to separate its components or to recover useful components from the liquid, and more particularly to distillatory apparatus of high distillation efficiency.

In conventional distillatory apparatus such, for example, as water producing apparatus for producing fresh water from sea water, the following construction is regarded as the most efficient. That is, an original liquid flows down in a filmy form on the surface of a pipe placed in a vertical direction and the pipe is disposed in a distilling chamber held under a predetermined atmospheric pressure and a plurality of such distilling chambers are provided in a vertical direction. In such a case, the atmospheric pressures in the distilling chambers are selected to gradually lower as the lowermost distilling chamber is approached. In order that evaporation may take place in the uppermost distilling chamber, a sufficiently heated original liquid is supplied to the uppermost distilling chamber and distilled liquids obtained from the respective distilling chambers are collected.

In such conventional apparatus, it is desired to increase the number of distilling chambers and to decrease the atmospheric pressure difference between adjacent ones of them for providing for enhanced efficiency in water production. To this end, if the length of the pipe of each distilling chamber is selected, for example, 2m and if the number of distilling chambers selected is 15, it is necessary to build a distilling column as high as more than 30m. The construction of such a high distilling column is very troublesome, time-consuming and costly. The original liquid supplied to each distilling chamber is supplied from the preceding chamber, that is, the original liquid supplied to the uppermost distilling chamber flows down into the subsequent ones one after another. Accordingly, it is necessary that the original liquid used be heated up to the temperature at which the original liquid can be evaporated in the uppermost distilling chamber, that is, up to the boiling point of the original liquid itself. However, the boiling point of the original liquid changes with the atmospheric pressure in each distilling chamber and becomes lower with a decrease in the atmospheric pressure. Therefore, in the conventional apparatus, the original liquid is heated up to the boiling point which is required in the uppermost distilling chamber, so that the original liquid supplied to the lower distilling chambers is once heated above the boiling-point temperature necessary for distillation in each distilling chamber. That is, useless heating is involved and this is the cause of lowering of the distillation efficiency.

Moreover, also in the conventional apparatus, the original liquid is heated by heat exchange between it and the distilled liquid obtained from each distilling chamber so as to provide for enhanced efficiency. However, when the distilled liquids from the respective distilling chambers are collected together, the temperatures of the distilled liquids are averaged, resulting in a large difference in temperature from the temperature necessary for the original liquid supplied to the uppermost distilling chamber. Accordingly, it is necessary that the original liquid once heated by the heat exchange be further heated appreciably. Further, according to the energy conservation law, the smaller the difference in amount between the two liquids to be heated exchanged becomes, the higher the heat exchange efficiency becomes. From this point of view, too, efficient heat exchange cannot be achieved with the prior art apparatus described above and the overall distillation efficiency is not enhanced. The water production efficiency of water production apparatus depends upon the quantity (cc) of distilled water obtained when about 540 cal. necessary for evaporation of 1 cc of water is applied to the water production apparatus. In the conventional apparatus, however, the water production efficiency is below 15 at the highest.

One object of this invention is to provide distillatory apparatus of high distillation efficiency.

Another object of this invention is to provide distillatory apparatus in which the number of distilling chambers can be easily increased.

Another object of this invention is to provide distillatory apparatus which is small in height and can be easily constructed at low cost in a short period of time.

Still another object of this invention is to provide a distilling chamber provided with a highly efficient heat exchanger.

SUMMARY OF THE INVENTION

In accordance with this invention, a plurality of distilling chambers are disposed in adjacent relation and the atmospheric pressures in the distilling chambers are respectively maintained at constant values which are selected to gradually decrease in a sequential order. An original liquid is supplied to each of the distilling chambers and is caused to make contact with a partition wall on the side of the adjacent distilling chamber of higher atmospheric pressure. In each distilling chamber, vapor evaporated from the original liquid makes contact with a partition wall on the side of the adjacent distilling chamber of lower atmospheric pressure and is condensed. The distilled liquids resulting from the condensation are individually drained out from distilling chambers and the remaining original liquids, that is, concentrated liquids, are also individually drained out from the distilling chambers. The original liquid to be supplied to each distilling chamber and the distilled liquid and the concentrated liquid drained out therefrom are heat exchanged with each other.

A heat exchanger for such heat exchange is preferred to be a three-fluid exchanger of the construction which has a plurality of plate-like passageways formed in layers and in which original liquid is flowed in one of the passageways and the distilled liquid and the concentrated liquid are respectively flowed in one of two passageways adjacent to the original liquid passageway and in the other in a direction opposite to the original liquid.

The plurality of distilling chambers can be formed by arranging, for example, plate-like members in opposing relation such that adjacent ones of the plate-like members define each distilling chamber therebetween and respectively form partition walls. In this case, the plate-like members are each disposed to extend in a vertical direction, so that the distilling chambers are arranged in a lateral direction. In each distilling chamber, the original liquid flows down in a filmy form substantially all over the partition wall on the side of the adjacent distilling chamber of higher atmospheric pressure. Alternatively, the distilling chambers are disposed one on another in a vertical direction and the lower partition wall of each distilling chamber is used as a liquid reservoir supplied with the original liquid.

For maintaining the distilling chambers under predetermined different atmospheric pressures of constant values, a pressure valve which opens when the atmospheric pressure difference exceeds a predetermined value is provided between adjacent distilling chambers and the atmospheric pressure difference of the predetermined value is applied to one outermost distilling chamber. Alternatively, a plurality of containers respectively having partly contained therein a liquid are provided and the liquid-filled portions of the containers are respectively connected to the empty portions of their subsequent ones of them through pipes. A compressor or a decompressor is connected to one end of the coupled containers to apply there to a predetermined pressure and when the pressure difference between adjacent distilling chambers exceeds its predetermined value, air passes through the liquid in each container, thereby to hold the pressure difference at the predetermined value at all times. This pressure difference is determined by the weight between the position of the pipe making contact with the liquid in the container and the liquid level and the specific gravity of the liquid used. In this manner, the pressures in the respective containers are made different and held at constant values, respectively. The upper empty portions of the containers are respectively connected through pipes to the corresponding distilling chambers to maintain them under the pressures in the containers.

Since there is the atmospheric pressure difference between adjacent ones of the distilling chambers, when the original liquid is supplied to each distilling chamber, the original liquid fed out from an original liquid supply source under a certain pressure is supplied to the distilling chamber through a valve for maintaining the atmospheric pressure predetermined in accordance with the atmospheric pressure of the distilling chamber. Alternatively, a plurality of containers respectively having partly contained therein the original liquid are provided and the lower original-liquid-filled portions are respectively connected through pipes to the upper empty portions of the subsequent ones of them one after another in a cascade fashion. The pressures in these containers are respectively held at the same values as the atmospheric pressures in the distilling chambers corresponding thereto. The original-liquid-filled portions of the containers are each connected through a pipe to an original liquid inlet port of the corresponding distilling chamber to supply thereto the original liquid. The original liquid is supplied from the outside to the container of the highest atmospheric pressure, from which the original liquid is supplied to the subsequent containers of lower atmospheric pressures one after another.

The distilled liquid from each of the distilling chambers is collected in the following manner. That is, the distilled liquids from the distilling chambers are respectively supplied to containers held under the same atmospheric pressures as those of the corresponding distilling chambers. The lower distilled-liquid-filled portions of the containers are respectively connected through pipes to upper empty portions of the subsequent ones of them. When the level of the distilled liquid in one container exceeds its predetermined value, the excess distilled liquid flows in the adjacent container of lower atmospheric pressure. And the overall distilled liquid is collected from the container of the lowest atmospheric pressure. The concentrated liquid is also collected with a similar construction.

DESCRIPTION OF THE PREFERRED EMBODIMENTS

Figure 1:
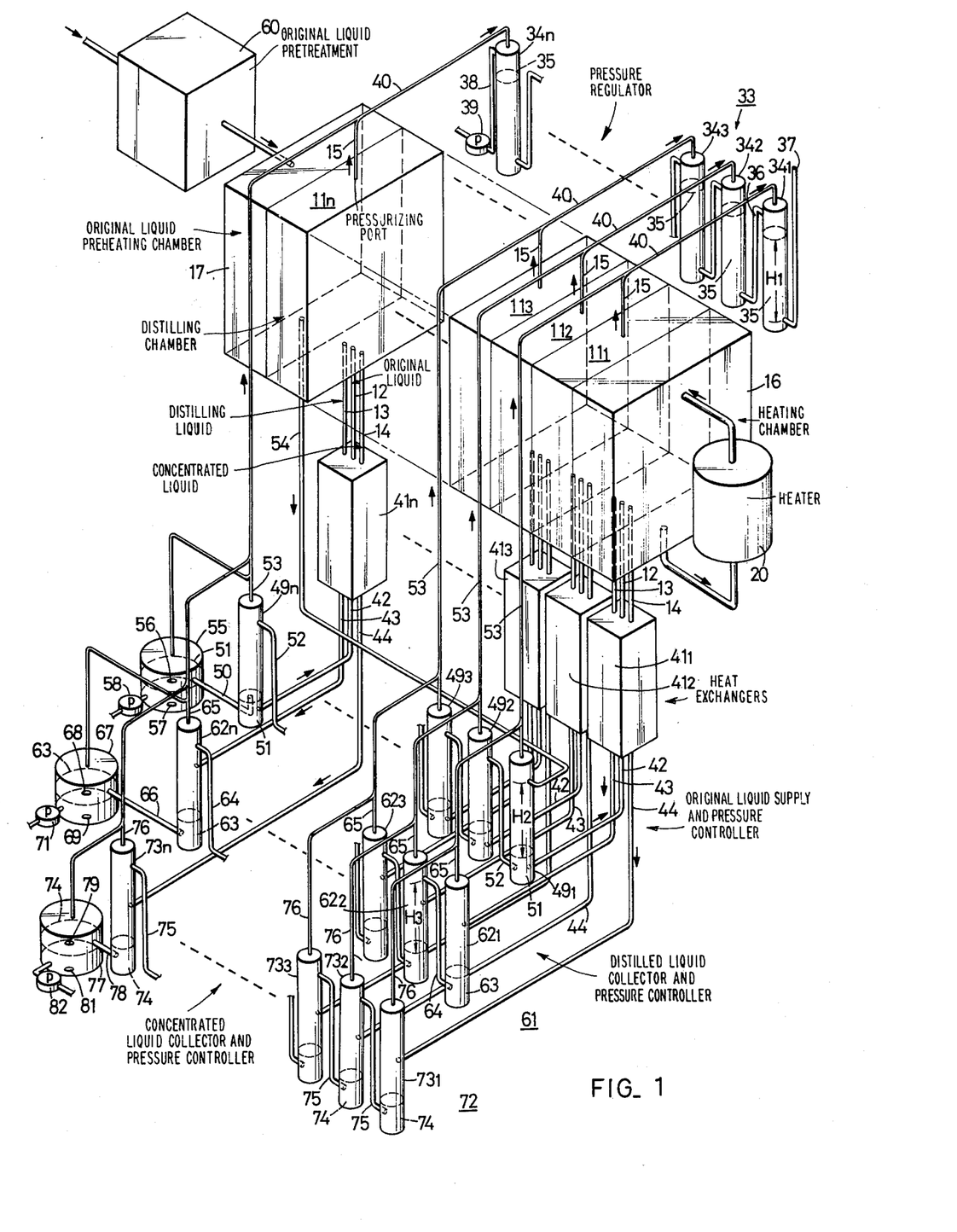
FIG. 1 shows the construction of one embodiment of the distillatory apparatus according to this invention.

FIG. 1 schematically shows the general construction of the distillatory apparatus according to this invention, in which distilling chambers $11_1$ to $11_n$ are disposed side by side. The distilling chambers $11_1$ to $11_n$ each have an original liquid inlet port 12 for supplying thereto an original liquid, a distilled liquid outlet port 13 for draining out therefrom a distilled liquid, a concentrated liquid outlet port 14 for draining out therefrom the remaining concentrated liquid and a pressurizing port 15 for applying thereto a predetermined atmospheric pressure. The distilling chambers $11_1$ to $11_n$ are respectively held under atmospheric pressures $P_1$ to $P_n$. The atmospheric pressures $P_1$ to $P_n$ are constant values which are so selected as to gradually diminish from $P_1$ to $P_n$. On the outside of the distilling chambers $11_1$ held under the highest atmospheric pressure $P_1$, a heating chamber 16 is provided adjacent thereto and, on the outside of the distilling chamber $11_n$ held under the lowest atmospheric pressure $P_n$, an original-liquid preheating chamber 17 is provided adjacent thereto.

Figure 2:
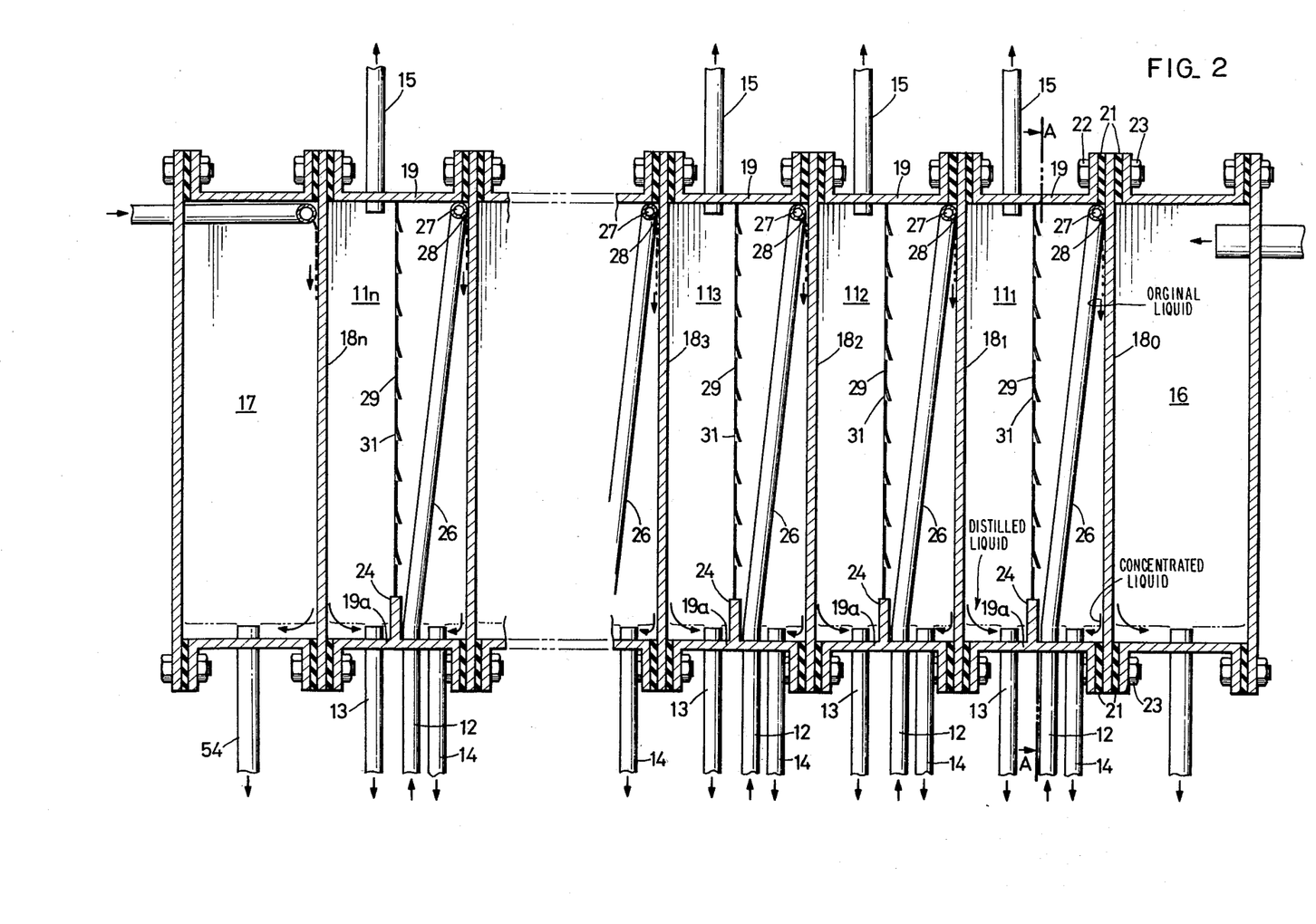
FIG. 2 illustrates, on an enlarged scale, one example of the distilling chamber section of the distillatory apparatus of FIG. 1.

The distilling chambers $11_1$ to $11_n$ are constructed, for example, as shown in FIG. 2. That is, plate-like members $18_0$ to $18_n$ of the same material as that employed for existing distillatory apparatus which is high in thermal conductivity and excellent in corrosion resistance, such, for example, as an aluminum-copper alloy, a copper-nickel alloy or the like, are disposed in predetermined spaced, side-by-side and opposing relation. The plate-like members $18_0$ to $18_n$ are placed with their surfaces extending substantially vertically. Between adjacent ones of the plate-like members $18_0$ to $18_n$, side walls 19 are interposed at the marginal portions of the plate-like members to form the distilling chambers $11_1$ to $11_n$. In this cae, both marginal portions of each side wall 19 are bent outwardly and the bent portions of the side walls of adjacent distilling chambers and the plate-like member and packings 21 inserted therebetween are clamped together by means of a bolt 22 and a nut 23. In the present example, the heating chamber 16 and the preheating chamber 17 are disposed on both sides of the array of the distilling chambers, as described above in connection with FIG. 1, and they are constructed in the same manner as the distilling chambers. Namely, the heating chamber 16 and the preheating chamber 17 can be formed to have the same construction as each of the distilling chambers.

In each distilling chamber, the original liquid supplied thereto flows down in the form of a film substantially all over the partition wall, i.e. the plate-like member 18 between the distilling chamber and the adjacent one of higher atmospheric pressure. To this end, on the inside of the bottom plate of each distilling chamber, that is, its lower side wall 19a, a short separation wall 24 is planted substantially midway between the two partition walls in parallel therewith. And, on the side of the adjacent distilling chamber of higher atmospheric pressure with respect to the separation wall 24, a pipe 26 is provided to communicate with original liquid inlet port 12 formed in the side wall 19a at the base of the separation wall 24 and to extend upwardly to the upper end of the partition wall on the side of the adjacent distilling chamber of higher atmospheric pressure. For example, in the distilling chamber $11_1$, the pipe 26 extends to the upper margin of the partition wall $18_o$. The upper open end of the pipe 26 is connected to the central portion of a distributing pipe 27 which extends laterally in contact with the partition wall $18_0$ along its upper margin (see FIG. 3). Both ends of the distributing pipe 27 are sealed and, in the portion of the distributing pipe 27 making contact with the partition wall $18_o$, many orifices 28 are formed along the entire length of the pipe 27 at substantially regular intervals.

Figure 3:
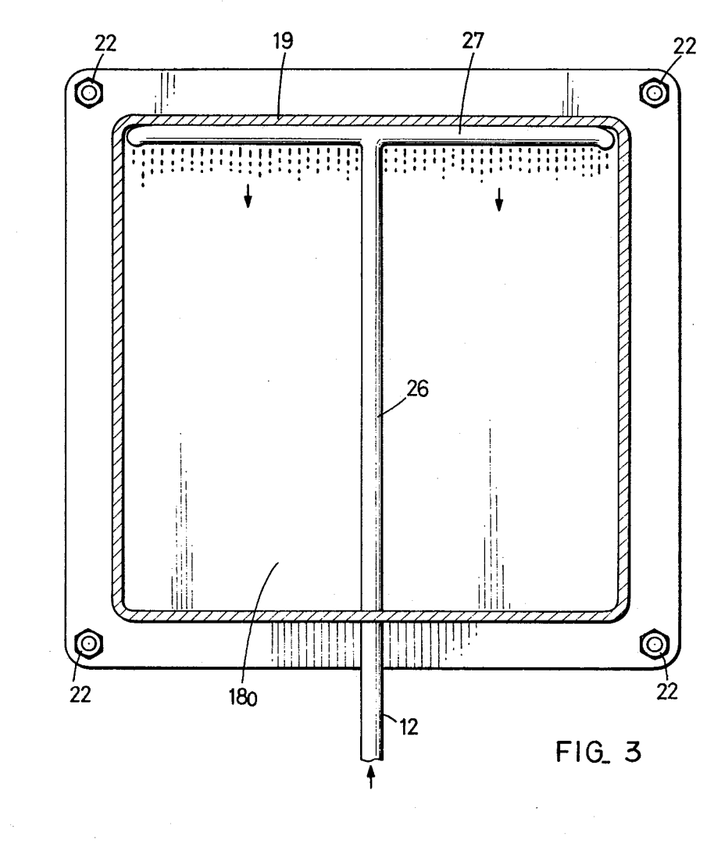
FIG. 3 is a cross-sectional view taken on the line A—A in FIG. 2.

Accordingly, the original liquid pushed up into the distributing pipe 27 through the pipe 26 is pumped out onto the partition wall $18_o$ through the orifices 28 from the distributing pipe 27 to flow down the partition wall $18_o$. The narrower the spacing of the orifices 28 is and the smaller their diameters are, the more filmily the original liquid flows down all over the surface of the partition wall. For example, where the orifices 28 are spaced 1 to 2mm, a filmy flow of the original liquid can be obtained all over the surface of the partition wall due to affinity of the original liquid for the partition wall. If a thin gauze or the like is applied over the partition wall surface to scatter the original liquid all over it, a filmy flow of the original liquid can be easily obtained although thermal conduction is a little deteriorated. Each distilling chamber has such means for flowing the original liquid in a filmy form substantially all over the partition wall surface.

The original liquid flowing down the partition wall is heated by the heat of the partition wall. This is, in the distilling chamber $11_1$ held under the highest atmospheric pressure, the partition wall $18_o$ is heated in the heating chamber 16 on the outside of the distilling chamber $11_1$ and, by the heat of the partition wall $18_o$, the original liquid flowing down thereon in the filmy form is heated and evaporated while flowing. The remaining original liquid, that is, the concentrated liquid, is drained out from the outlet port 14 which is formed in the bottom wall 19a to communicate with the distilling chamber on the side of the adjacent one of higher atmospheric pressure with respect to the separation wall 24. On the other hand, the evaporating vapor passes through small orifices 31 of the filter member 29 formed to extend upwardly from the separation wall 24 in parallel with the partition walls 18 in a manner to divide the distilling chamber into two, and reaches the side of the partition wall $18_1$ between the distilling chamber $11_1$ and the adjacent chamber $11_2$ of lower atmospheric pressure. The filter member 29 is used in conventional distillatory apparatus, too, and is to separate water drops or the like and vapor from each other. Only vapor passes through the filter member 29 to reach the partition wall $18_1$ on the side of the distilling chamber $11_2$ of lower atmospheric pressure and the vapor makes contact with the partition wall $18_1$ to be condensed to a distilled liquid. The distilled liquid flows down the partition wall $18_1$ and then drained out from the distilled liquid outlet port 13 formed in the bottom wall 19a between the partition wall $18_1$ and the separation wall 24. When the vapor is condensed on the partition wall $18_1$, the former heats the latter and this heat heats and evaporates the original liquid flowing down in a filmy form on the partition wall $18_1$ in the adjacent distilling chamber $11_2$ of lower atmospheric pressure. The heating chamber 16 is supplied with heated vapor from a heater 20 (FIG. 1) and the partition wall $18_o$ is heated thereby.

In this manner, by the heat resulting from the condensation of vapor in one distilling chamber, the partition wall between it and the next subsequent distilling chamber is heated to evaporate the original liquid in the latter and this heating is repeated for each distilling chamber. To perform this, the atmospheric pressures of the distilling chambers are required to gradually lower in a sequential order. That is, it is necessary to select the atmospheric pressures such that as the distilling chamber $11_n$ is approached, the original liquid heating temperature becomes lower but that the original liquid reaches its boiling point at such a temperature. Accordingly, the values of the atmospheric pressures $P_1$ to $P_n$ of the distilling chambers are selected to decrease one after another, as previously described. For maintaining the atmospheric pressures of the distilling chambers at such constant values respectively, a pressure regulator is employed in this embodiment. The regulator is adapted to obtain correct and small atmospheric pressure differences with ease. Turning back to FIG. 1, a pressure regulator 33 comprises containers $34_1$ to $34_n$ respectively corresponding to the distilling chambers $11_1$ to $11_n$. A liquid 35 is contained in each container up to its intermediate height. The upper empty portion of each container 34 is coupled with the lower liquid-filled portion of the next subsequent container by means of a pipe 36, as shown. The liquid-filled portion of the rightmost container $34_1$ opens to a constant atmospheric pressure, for example, the air, through a pipe 37. The empty portion of the leftmost container $34_n$ is always evacuated by a vacuum pump 39 through a pipe 38. The height $H_1$ from the liquid-filled position of the coupling pipe 36 to the surface of the liquid in each container 34 is selected in accordance with the atmospheric pressure difference desired to obtain between adjacent ones of the containers. For example, where the atmospheric pressure is 0.02 atm. and water is used as the liquid 35, the height $H_1$ is selected to be 20 cm.

The containers are always exhausted of the air by the vacuum pump 39, so that for example, when the atmospheric pressure $P_1$ in the container $34_1$ becomes lower than 0.98 atm., the difference between it and the atmospheric pressure which is a reference atmospheric pressure supplied through the pipe 37, that is, 1 atm., exceeds 0.02 atm. and the air enters the container $34_1$ through the pipe 37 to maintain the atmospheric pressure difference at 0.02 atm. Conversely, when the atmospheric pressure $P_1$ in the container $34_1$ becomes higher than 0.98 atm., the air in the container $34_1$ enters the adjacent container $34_2$ through the coupling pipe 36, by which the atmospheric pressure in the container $34_1$ is always held at 0.98 atm.. That is, the atmospheric pressure $P_1$ in the container $34_1$ has the difference of 0.02 atm, with respect to the atmosphere and the atmospheric pressure $P_2$ in the container $34_2$, too. When the height $H_1$ of the liquid 35 in the respective containers is similarly selected to be the same value, that is, 20 cm in the above example, the atmospheric pressures in the containers are held at such values which decrease by 0.02 atm. one after another. This atmospheric pressure difference can be altered by adjusting the height $H_1$ of the liquid 35 and, further, it can be obtained with high accuracy, so that many contact atmospheric pressures having a small difference from one another can be obtained. The constant atmospheric pressures $P_1$ to $P_n$ thus obtained are respectively applied to the pressurizing ports 15 of the corresponding distilling chambers $11_1$ to $11_n$ through coupling tubes 40 which are connected to ports formed in the top end portions of the containers $34_1$ to $34_n$ above the surface of the liquid 35. As a result of this, the distilling chambers $11_1$ to $11_n$ are respectively held under the atmospheric pressures $P_1$ to $P_n$ of the containers $34_1$ to $34_n$.

With this invention, heat exchange is achieved between the original liquid to be supplied to each distilling chamber and the distilled liquid and the concentrated liquid drained out therefrom. Namely, as depicted in FIG. 1, heat exchangers $41_1$ to $41_n$ are provided respectively corresponding to the distilling chambers $11_1$ to $11_n$. A pipe 42 supplied with the original liquid is connected to the original liquid inlet port 12 through the heat exchanger 41. The distilled liquid and the concentrated liquid respectively drained out through the distilled liquid outlet port 13 and the concentrated liquid outlet port 14 respectively flow to a distilled liquid drain pipe 43 and a concentrated liquid drain pipe 44 through the heat exchanger 41.

Figure 4:
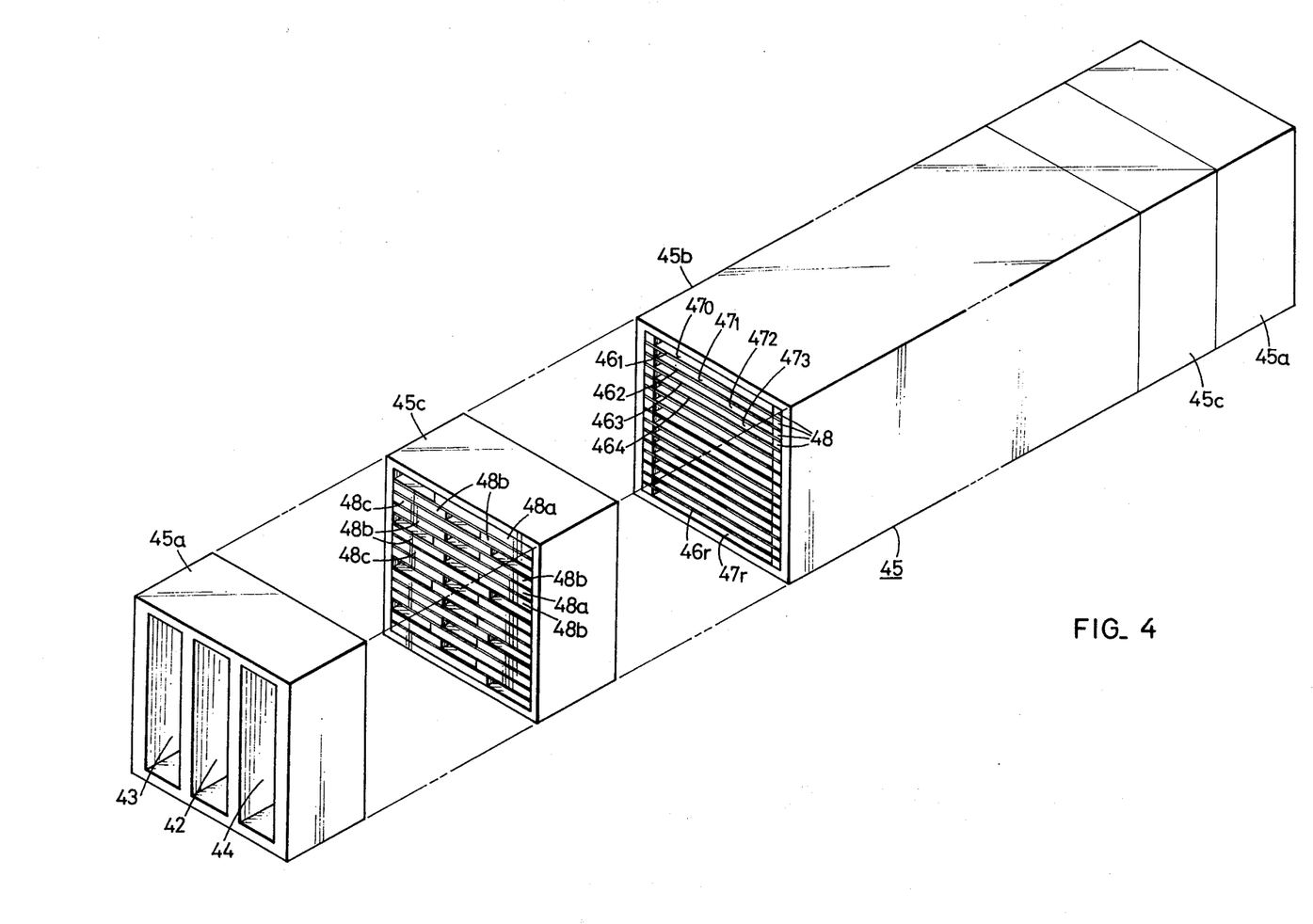
FIG. 4 is a perspective view showing one example of a three-fluid heat exchanger for use in this invention.

The heat exchanger 41 is preferred to be of such a construction, for example, as shown in FIG. 4. Namely, in a conduit 45 having a square cross-section, partition plates $46_1$ to $46_r$ are disposed one above another in parallel relation to top and bottom panels of the conduit 45, forming plate-like passage ways $47_o$ to $47_r$ in layers between the top and bottom panels of the conduit 45. The original liquid and the distilled and the concentrated liquids, flowing in opposite directions, are supplied to the heat exchanging section in such a manner that the distilled and the concentrated liquid flow in the passage ways on both sides of each passage way in which the original liquid flows. To perform this, the original liquid supply pipe 42 is formed at the center of one end portion 45a of the conduit 45 and the distilled liquid drain pipe 43 and the concentrated liquid drain pipe 44 are formed on both sides of the original liquid supply pipe 42. In a heat exchanging section between the end portion 45a of the conduit 45 and the conduit body 45b having formed therein the plate-like passage ways in layers, spacers 48 are respectively disposed on the right and left inner walls of the conduit 45 between adjacent ones of the partition plates $46_1$ to $46_r$ to define each passage way therebetween. In the uppermost passage way $47_o$, a separating piece 48a is provided which extends leftwardly a length of two-thirds the width of the passage way from the right-hand spacer 48. The next passage way $47_1$ has disposed therein separating pieces 48b which respectively extend inwardly a length of one-third the width of the passage way from the right- and left-hand spacers 48. The next passage way $47_2$ has provided therein a separating piece 48c extending rightwardly a length of two-thirds the width of the liquid path from the left-hand spacer 48. The next passage way $47_3$ has formed therein the separating pieces 48b extending inwardly from the right- and left-hand spacers 48, as is the case with the passage way $47_1$. And the next passage way $47_4$ has disposed therein the separating piece 48a extending from the right-hand spacer 48, as is the case with the passage way $47_o$. In this manner, the separating pieces 48a, 48b, 48c, 48b are respectively provided in the remaining passage ways in a repeating cyclic order. Consequently, in the present embodiment, the original liquid from the original liquid supply pipe 42 flows in the passage ways $47_1$, $47_3$, $47_5$, . . . having respectively provided therein the separating pieces 48b. On the other hand, the distilled liquid supplied in the direction opposite to the original liquid, flows in the passage ways $47_0$, $47_4$, $47_8$ . . . and is drained out from the drain pipe 43. And the concentrated liquid flows in the passage ways $47_2$, $47_6$, $47_{10}$ . . . to reach the drain pipe 44.

Since such heat exchange takes place in the heat exchanger corresponding to each distilling chamber, the original liquid supplied to the distilling chamber is evaporated to provide the distilled liquid and the concentrated liquid. Accordingly, the amount of the original liquid supplied is always equal to the sum of the amounts of the distilled liquid and the concentrated liquid obtained. Namely, the flow rates of the liquids to be heat-exchanged are equal to each other, and the efficiency of heat exchange is very high. Before the distillatory apparatus reaches its steady state after starting, the ratio of the amount of the distilled liquid to that of the concentrated liquid undergoes a change but the sum of their amounts is always constant. The heat exchanger 41 may also be adapted to effect heat exchange first between the original liquid and the distilled liquid and then between the original liquid and the concentrated liquid. In this case, since the flow rate of the original liquid and that of the distilled liquid or the concentrated liquid are different from each other, the efficiency of heat exchange is low.

Further, in the embodiment of FIG. 4, the passage way of the original liquid is always in contact with those of both of the distilled liquid and the concentrated liquid, so that, for example, even if the distilled liquid momentarily becomes zero, the original liquid and the concentrated liquid flow in opposite directions in contact with each other at all times to effect heat exchange between them. In addition, since heat exchange is achieved for each distilling chamber, the amount of the concentrated liquid increases corresponding to the amount of the distilled liquid decreased and the flow rates of the original liquid and the concentrated liquid to be heat exchanged are held equal to each other, ensuring an efficient heat exchange. In the case where the flow rate of the distilled liquid is zero, the contact area of the original liquid with the concentrated liquid is one-half that in the steady state, so that the efficiency of heat exchange is a little decreased but efficiency of about 80% of that in the steady state can be easily obtained.

Since the distilling chambers are respectively held under different atmospheric pressures as described previously, it is necessary to prevent the atmospheric pressures from being disturbed by the supply of the original liquid to the distilling chambers. To this end, it is also possible to provide a valve in the passage way of the original liquid supplied to each distilling chamber to maintain the atmospheric pressure difference as predetermined. However, the purpose can be easily served with such a simple construction as shown in FIG. 1. Namely, containers $49_1$ to $49_n$ are provided respectively corresponding to the distilling chambers $11_1$ to $11_n$. Each of the containers $49_1$ to $49_n$ has partly contained therein the original liquid 51. The original-liquid-filled portion of the container $49_1$ and the upper empty portion of the container $49_2$ are coupled by a coupling pipe 52 with each other. In this manner, the containers $49_1$ to $49_n$ are coupled to adjacent ones of them through coupling pipes. Further, the empty portions of the containers $49_1$ to $49_n$ are respectively coupled by pipes 53 to coupling ports 40 of the containers $34_1$ to $34_n$ of the atmospheric pressure regulator 33, by which the containers $49_1$ to $49_n$ are held under the atmospheric pressures $P_1$ to $P_n$, respectively.

To the container $49_1$ of the highest atmospheric pressure $P_1$ is supplied the original liquid through a pipe 54. In this embodiment, the original liquid is preheated in the preheating chamber 17. The original liquid is supplied first to a pretreatment device 60 to remove, for example, dust and carbonic ions from the original liquid. The device 60 may be an ordinary one. The original liquid pretreated by the pretreatment device 60 is then applied to the preheating chamber 17 to flow down in a filmy form on the partition wall between the preheating chamber 17 and the distilling chamber $11_n$. While flowing down the partition wall, the original liquid is heated by the heat released by the condensation of vapor in the distilling chamber $11_n$, and the original liquid thus preheated in the preheating chamber 17 is supplied through the pipe 54 to the container $49_1$ from its empty portion. The original liquid supply pipes 42 are respectively led out from the bottoms of the liquid-filled portions and coupled to the corresponding distilling chambers $11_1$ to $11_n$ through the original liquid supply pipes 42 of the heat exchangers $41_1$ to $41_n$.

The distance $H_2$ between the surface of the original liquid in the container $49_1$ and the position of attachment of the coupling pipe 52 to the container $49_2$ is selected in accordance with the difference in atmospheric pressure between the containers $49_1$ and $49_2$, for example, 0.02 atm. in the above example. Accordingly, if the liquid in the container $49_1$ exceeds its set level, the original liquid is sucked through the pipe 52 into the container $49_2$ of the atmospheric pressure $P_2$ lower than that of the container $49_1$. In a similar manner, where the level of the original liquid rises in the container $49_2$, the original liquid flows into the next container $49_3$ through the pipe 52. Thus, the level of the original liquid 51 in each of the containers $49_1$ to $49_n$ is held at its predetermined value. Accordingly, the amount of the original liquid supplied from each container 49 to each distilling chamber 11 is always maintained at the constant value and the original liquid exists in the pipes 42 and 52, so that there is no possibility of the atmospheric pressures in the distilling chambers being disturbed.

The final-stage container $49_n$ has coupled thereto a pipe 50 at the position corresponding to the set level of the original liquid 51 and when the original liquid rises above the set level, the excessive liquid is supplied to a liquid reservoir 55 through the pipe 54. In the liquid reservoir 55, there are provided at upper and lower sides electrodes 56 and 57 for detecting the surface of the original liquid 51. When the upper limit detecting electrode 56 detects the liquid surface, a pump 58 is driven to drain out the original liquid 51 from the liquid reservoir 55 and when the liquid surface reaches its predetermined lowest level, the electrode 57 detects it to stop the operation of the pump 58. Thus, the original liquid 51 is not completely exhausted and the atmospheric pressure in the liquid reservoir 55 is not disturbed. The atmospheric pressure in the liquid reservoir 55 is held at the same value $P_n$ as the container $49_n$.

In FIG. 1, the respective parts are arranged for a better understanding of their interconnections and for convenience of illustration but, in practice, their relative positions in a vertical direction are so selected as to satisfy the abovesaid operations.

Also in the case of collecting the distilled liquid drained out from each distilling chamber, it is arranged that the atmospheric pressure in the distilling chamber is not disturbed. To perform this, a distilled liquid collecting device 61 comprises containers $62_1$ to $62_n$ respectively corresponding to the distilling chambers $11_1$ to $11_n$. Each of the containers $62_1$ to $62_n$ has partly contained therein a distilled liquid 63. The lower liquid-filled portion of the container $62_1$ and the empty portion of the container $62_2$ are coupled by a coupling tube 64 with each other. The containers $62_1$ to $62_n$ are each coupled to adjacent ones of them in the abovesaid manner. The upper portions of containers $62_1$ to $62_n$ are respectively coupled by pipes 65 to the coupling tubes 40 of the containers $34_1$ to $34_n$ in which the atmospheric pressures $P_1$ to $P_n$ are provided. Further, the distilled liquid drain pipes 43 are each attached to the empty portion of each of the containers $62_1$ to $62_n$ at a position below the coupling tube 64 and connected to the corresponding portions of the heat exchangers $41_1$ to $41_n$, respectively. The height $H_3$ between the surface of the distilled liquid 63 and the empty upper end of the coupling tube 64 is selected in accordance with the atmospheric pressure difference between adjacent ones of the containers. Accordingly, where the distilled liquid 63, in the container, for example, $62_1$, exceeds its predetermined level to raise the atmospheric pressure $P_1$, the distilled liquid is sucked in the next container $62_2$. Thus, where the distilled liquid is supplied from distilling chamber to the container $62_2$ and exceeds its predetermined level, the excess distilled liquid is transferred to the next subsequent containers one after another. And the distilled liquid in the final-stage container $62_n$ is supplied to a liquid storage tank 67. The liquid tank 67 is maintained under the atmospheric pressure $P_n$ and has a highest level detecting electrode 68 and a lowest level detecting electrode 69. When the distilled liquid gathers to reach the electrode 68, a distilled liquid suction pump 71 is driven to pump out the distilled liquid from the liquid storage tank 67 and when the level of the distilled liquid reaches the electrode 69, the pumping-out operation is stopped. In this manner, the distilled liquid can be collected without disturbing the atmospheric pressure in each distilling chamber.

The concentrated liquid is similarly collected. Namely, a concentrated liquid collecting device 72 comprises containers $73_1$ to $73_n$ respectively corresponding to the distilling chambers $11_1$ to $11_n$. The liquid-filled portion of the container $73_1$ and the empty portion of the container $73_2$ are coupled by a coupling tube 75 to each other and, in a likewise manner, the other remaining containers are each coupled to adjacent ones of them by the coupling tube 75. The upper empty portions of the containers $73_1$ to $73_n$ are respectively coupled to the coupling tubes 40 of the containers $34_1$ to $34_n$ of the pressure regulator 33 through coupling pipes 76, so that the containers $73_1$ to $73_n$ are respectively held under the atmospheric pressures $P_1$ to $P_n$. Further, the empty portions of the containers $73_1$ to $73_n$ are respectively coupled with the concentrated liquid drain pipes 44 of the heat exchangers $41_1$ to $41_n$. The concentrated liquid drained out from each distilling chamber is supplied to each of the containers $73_1$ to $73_n$. When the concentrated liquid exceeds a predetermined level, the excess liquid is transferred to the next container of lower atmospheric pressure and similarly transferred to the subsequent containers one after another, thereafter being supplied from the final-stage container $73_n$ to a concentrated liquid reservoir 77 through a pipe 78. The concentrated liquid reservoir 77 is held under the same atmospheric pressure $P_n$ of the final-stage container $73_n$ and has provided therein a highest liquid level detecting electrode 79 and a lowest liquid level detecting electrode 81. When the concentrated liquid in the reservoir 77 reaches the height of the electrode 79, a concentrated liquid drain pump 82 is driven to pump out the concentrated liquid from the reservoir 77 and when the level of the concentrated liquid reaches the electrode 81, the drain pump 82 is stopped.

In accordance with the distillatory apparatus of this invention described in the foregoing, the original liquid is independently supplied to each of the distilling chamber and, at this time, heat exchanged with the distilled liquid and the concentrated liquid drained out from the distilling chamber. Accordingly, if the masses of the distilled liquid and the concentrated liquid obtainable per second, for example, in a $k$th distilling chamber $11_k$ are taken as $V_k$g/sec and $U_k$g/sec respectively, the mass of the original liquid flowing in the $k$th distilling chamber $11_k$ per sec is $V_k + U_k$. The boiling point in the distilling chamber $11_k$ is taken as $T_k°$ C. Since the quantity of the original liquid flowing in the heat exchanger $41_k$ corresponding to the distilling chamber $11_k$ is equal to the sum of the quantities of the distilled liquid and the concentrated liquid to be heat exchanged with the original liquid as described previously, if the heat exchanger $41_k$ is formed sufficiently long, the coefficient of heat exchange is large and the original liquid flowing in the heat exchanger $41_k$ is heated from $T_o°$ C to a temperature a little lower than $T_k°$ C and the temperature of the original liquid flowing in the distilling chamber $11_k$ is $(T_k - \tau)°$ C. According to the energy conservation law, the temperature of the distilled liquid and the concentrated liquid drained out is $(T_o + \tau)°$ C.

In the distilling chamber $11_{k-1}$ preceding the kth one, the heat released by the condensation of the original liquid on the partition wall per sec is $\mu V_{k-1}\{\mu(\text{cal.}/9)$ is the condensation heat$\}$. By this heat, the original liquid in the kth distilling chamber $11_k$ is heated to its boiling point to be evaporated by $V_k$. If the specific heat of the original liquid is assumed to be 1, the quantity of heat is as follows:

$$\{T_k - (T_k - \tau)\} \times (V_k + U_k) + \mu V_k = \tau(V_k + U_k) + \mu V_k$$

Consequently, according to the energy conservation law, it follows that $$\mu V_{k-1} = \tau(V_k + U_k) + \mu V_k \quad (1)$$

If the concentration degree of the original liquid is taken as $\eta$, it follows that $$\eta = \frac{V_k + U_k}{U_k}, \quad V_k = (\eta - 1)U_k$$

Substituting the above into the equation (1), it follows that $$\mu V_{k-1} = \left[\frac{\eta}{\eta - 1}\tau + \mu\right]V_k$$

$$V_k = \frac{1}{1 + \frac{\eta}{\eta - 1} \cdot \frac{\tau}{\mu}} V_k$$

If $$C = \frac{1}{1 + \frac{\eta}{\eta - 1} \cdot \frac{\tau}{\mu}} \quad (3)$$

it follows that $$V_k = CV_{k-1} \quad (4)$$

Here, if the concentration degree $\eta$ of the original liquid and the temperature difference $\tau$ in the heat exchange are the same in all of the distilling chambers, C becomes a constant value and $$V_k = C^{k-1}V_1 \quad (5)$$

Accordingly, the total amount of the distilled liquid is given as follows:

$$V_t = \sum_{k=1}^{n} V_k = \frac{1 - C^\eta}{1 - C} V_1 \quad (6)$$

where $n$ is the number of distilling chambers used. Further, the heating energy applied to the first-stage distilling chamber $11_1$ in one second is given by the following equation:

$$Q = \tau(V_1 + U_1) + \mu V_1 = \frac{\mu}{C} V_1 \quad (7)$$

From the equations (6) and (7), the water producing efficiency R is obtained as follows:

$$R = \frac{V_t}{Q/\mu} = \frac{C(1 - C^\eta)}{1 - C} \quad (8)$$

Next, the limit of the water producing efficiency of the distillatory apparatus of this invention will be discussed. The water producing efficiency limit $Rm$ obtainable when the number $n$ of the distilling chambers is sufficiently large is given by the following equation:

$$Rm = \lim_{n \to \infty} \frac{C(1 - C^\eta)}{1 - C} = \frac{C}{1 - C} = \frac{\eta - 1}{\eta} \cdot \frac{\mu}{\tau} \quad (9)$$

This indicates that the temperature difference $\tau$ depending upon the property of the heat exchanger used imposes a limitation on the water producing efficiency. Accordingly, if the temperature difference $\tau$ in heat exchange is 1/2, the water producing efficiency is about 135. The selection of such a temperature difference of 0.5° C in heat exchange can be achieved relatively easily with the three-fluid heat exchanger described previously with regard to FIG. 4. Further, even where a simple heat exchanger having a temperature difference of, for example, about 5° C is employed in place of such a highly efficient heat exchanger, if the concentration degree $\eta$ is 4, a water producing efficiency of about 30 can be obtained in the case of the number $n$ of the distilling chambers used being 40 and a water producing efficiency of about 37 in the case of the number $n$ being 50. As compared with a maximum water producing efficiency of about 15 in the prior art, the water production efficiency of the apparatus of this invention is remarkably high. Further, the temperature difference in heat exchange can be reduced as small as 1° or 0.5° C and, in such a case, the water production efficiency can be further enhanced.

Moreover, in the present invention, distilling pipes are not disposed one on another in their lengthwise direction as in the prior art. The distilling chambers employed in this invention may be thin and can be easily formed to have a thickness of, for example, less than 5cm. In addition, in the case where the distilling chambers are disposed side by side as in the embodiment shown in FIG. 1, the apparatus can be easily assembled, no matter how many distilling chambers may be employed. Accordingly, the number $n$ of the distilling chambers can be increased as desired, so that the water production efficiency can be enhanced correspondingly. Further, by selecting the height of the partition wall to be 2 to 3 m, evaporation in each distilling chamber can be effected sufficiently. Since the thickness of the partition wal is small and since the distilling chambers are not placed one on another in the direction in whih the original liquid flows down, the length of the partition wall in the direction of flow of the original liquid can be increased. The partition wall can be formed, for example, 5 to 10 m long and, in this case, the velocity of flow of the original liquid flowing down the partition wall is increased correspondingly to provide for enhanced coefficient of thermal conductivity. And the area of the partition wall is naturally increased, by which the amount of distilled liquid can be sufficiently increased.

Figure 5:
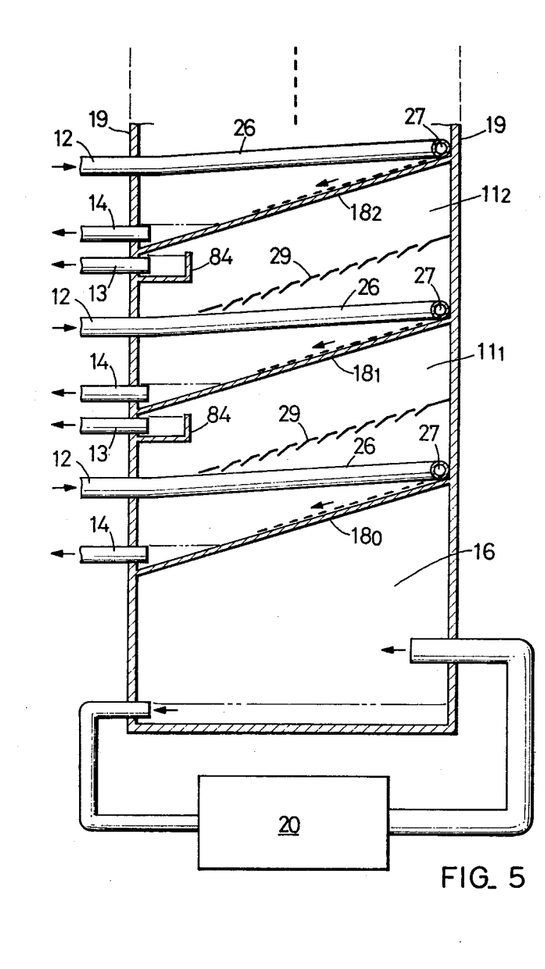
FIG. 5 is a cross-sectional view showing another embodiment of the distillatory apparatus of this invention in which distilling chambers are disposed one on another in a vertical direction.

Although the foregoing embodiment has been described in connection with the case where the distilling chambers are disposed side by side, they can also be placed one on another in a vertical direction. As shown in FIG. 5 in which parts corresponding to those in FIGS. 1 and 2 are identified by the same reference numerals, the side walls 19 of the distilling chambers are placed vertically and the plate-like members, that is, the partition walls $18_o$, $18_1$, $18_2$ . . . are disposed one above another a little aslant and they are supported by the side walls 19. Under the lowermost stage, that is, under the partition wall $18_o$, the heating chamber 16 is provided and the distilling chambers $11_1$, $11_2$ . . . are provided one after another above the heating chamber 16. Each distilling chamber has the original liquid inlet port 12, the distilled liquid outlet port 13, the concentrated liquid outlet port 14 and the filter member 29, and the original liquid inlet port 12 is connected to the distributing pipe 27 through the pipe 26, as in the embodiment illustrated in FIG. 1. For draining out the distilled liquid resulting from condensation of vapor on the partition wall, a distilled liquid receptacle 84 is provided adjacent to the lower end portion of the upper partition wall of each distilling chamber for receiving the distilled liquid flowing down the upper partition wall and the distilled liquid received by the receptacle 84 is drained out from the distilled liquid outlet port 13.

Figure 6:
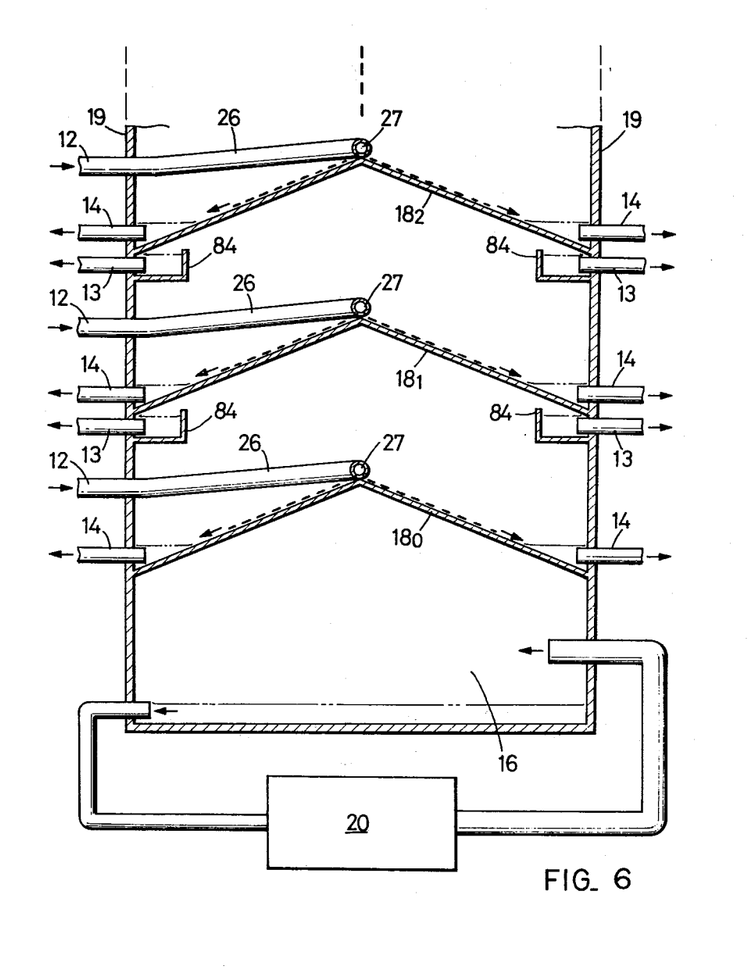
FIG. 6 is a cross-sectional view illustrating a modified form of the distilling chamber section depicted in FIG. 5.

Further, it is also possible to employ such a construction as shown in FIG. 6 in which the partition walls 18 are each shaped in the form of a greatly-sloping mountain and the distributing pipe 27 is provided at the top of the partition wall for flowing the original liquid therefrom to right and left. In this case, the distilled liquid outlet port 13 and the receptacle 84 are disposed at the base of the mountain-shaped partition wall on either side. In FIG. 6, parts corresponding to those in FIG. 5 are indicated by the same reference numerals and no detailed description will be repeated. Also in FIG. 5 and 6, the original liquid flows down the partition wall a little tilted and the distilling chambers are disposed one after another in the vertical direction. However, since the thickness of each distilling chamber is very small, the number of distilling chambers can be increased.

Figure 7:
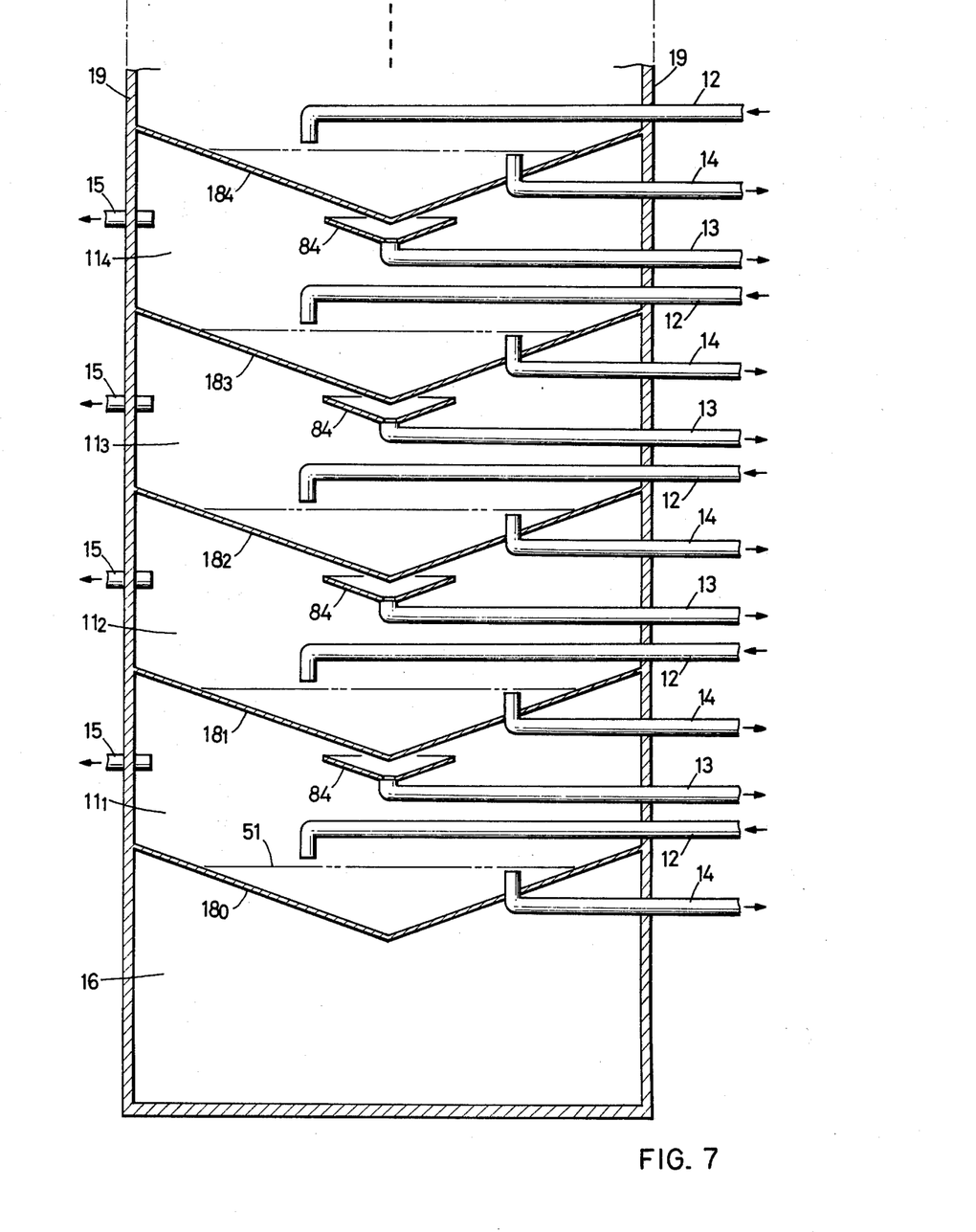
FIG. 7 is a cross-sectional view showing another example of this invention apparatus in which the partition walls between the distilling chambers are each formed to serve as a liquid reservoir.

Further, in the foregoing, the original liquid flows down the partition wall but it is also possible to evaporate the original liquid without flowing it. For example, as depicted in FIG. 7, the partition walls 18 are each constructed in a dish-like form and they are disposed in a predetermined spaced relation in a vertical direction and supported by the side walls 19. The distilling chambers $11_1$, $11_2$, $11_3$ . . . are each defined by adjacent ones of the partition walls 18 and the side walls 19 and arranged in the vertical directions. The original liquid 51 is stored on the dish-shaped partitio wall 18 in each distilling chamber. The distilled liquid receptacle 84 is disposed opposite to the underside of the lowermost portion of each partition wall 18 and is connected to the distilled liquid outlet port 13. The inner end of the original liquid inlet port 12 is positioned above the end of one upper portion of the partition wall and the inner end of the concentrated liquid outlet port 14 is positioned at the end of the partition wall on the opposite side from the original liquid inlet port 12. By the position of the inner end of the concentrated liquid outlet port 14, the level of the concentrated liquid is determined. The distillatory apparatus of such a construction is convenient in the case of collecting the remnant resulting from evaporation of an original liquid or obtaining a concentrated liquid of high concentration degree. In the case where the original liquid flows down in the filmy form on the partition wall as shown in FIGS. 1, 5 and 6, there is the possibility of evaporating all of the original liquid by overheating and, in such a case, no concentrated liquid is obtainable. Accordingly, in the case of requiring the concentrated liquid, the construction of FIG. 7 is preferred. For obtaining a large amount of distilled liquid, for example, in the case of water producing apparatus, it is preferred to employ the construction of flowing the original liquid in the filmy form on the partition wall.

Figure 8:
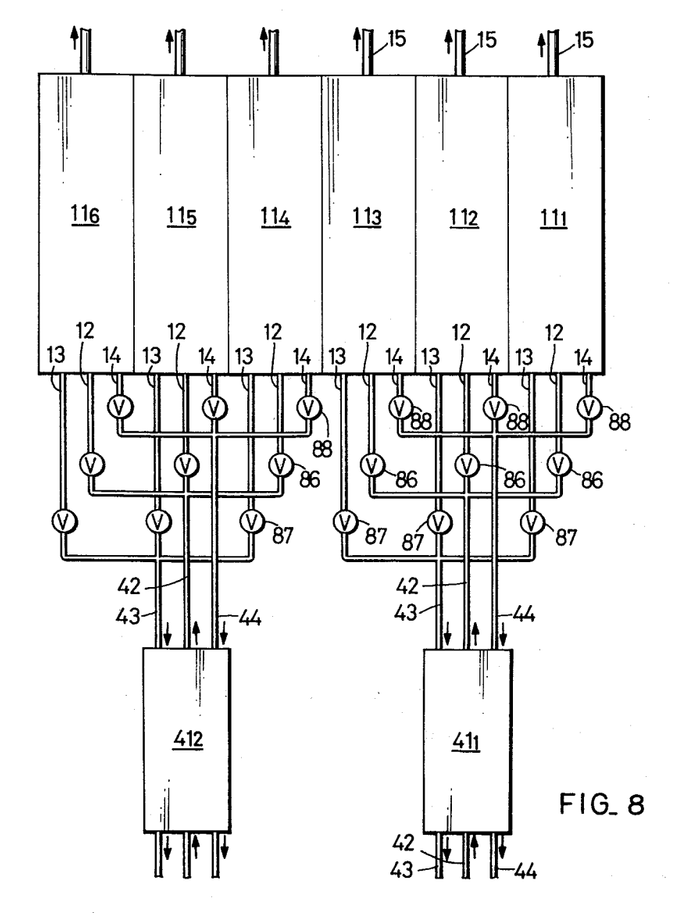
FIG. 8 shows the construction of another example of this invention apparatus in which heat exchangers are each employed in common to a plurality of distilling chambers.

Thus, with the distillatory apparatus of this invention, it is possible to increase the number of distilling chambers and, with the increased number of distilling chambers, the temperature difference between the distilled liquids obtained from adjacent distilling chambers is as small as, for example, 2° C. Consequently, even if one heat exchanger is used in common to a plurality of adjacent distilling chambers, the heat exchange efficiency is not lowered. For example, as illustrated in FIG. 8, the heat exchanger $41_1$ is employed in common to the three distilling chambers $11_1$, $11_2$ and $11_3$ and the original liquid supply pipe 42 is divided into three at the outlet of the heat exchanger $41_1$ and connected to the original liquid inlet port 12 of each of the distilling chambers $11_1$ to $11_3$. In this case, these divided supply pipes respectively have inserted therein a valve 86, by which the atmospheric pressure difference between adjacent ones of the distilling chambers $11_1$ to $11_3$ is maintained. Further, the distilled liquid outlet ports 13 of the distilling chambers $11_1$ to $11_3$ are respectively connected through collecting pipes to the inlet of the drain pipe 43 of the heat exchanger $41_1$. In this case, a valve 87 is inserted in each collecting pipe to maintain the atmospheric pressure difference between adjacent ones of the distilling chambers. In a similar manner, the concentrated liquid outlet ports 14 of the three distilling chambers $11_1$ to $11_3$ are connected to the inlet of the concentrated liquid drain pipe 44 of the heat exchanger $41_1$ through pipes, each having inserted therein a valve 88. Also in connection with the other distilling chambers, heat exchangers are each employed in common to a plurality of adjacent ones of them in exactly the same manner as described above.

It will be apparent that many modifications and variations may be effected without departing from the scope of the novel concepts of this invention.

What is claimed is:

1. A distillatory apparatus, which comprises:
a plurality of distilling chambers disposed in adjacent relation to one another;
original liquid supplying means coupled to each of said chambers of individually supplying an original liquid to each of said distilling chambers;
distilled liquid draining means coupled to each of said chambers for individually draining out distilled liquids produced in each of said distilling chambers;
concentrated liquid draining means coupled to each of said chambers of individually draining out concentrated liquids remaining in each of said distilling chambers;
pressure retaining means coupled to said chambers for maintaining the atmospheric pressures in said distilling chambers respectively at constant values which gradually decrease one after another; and
a plurality of heat exchanging devices coupled to said plurality of distilling chambers respectively for effecting heat exchange between the original liquid which is supplied to each of said distilling chambers and the distilled and concentrated liquids which are drained out therefrom, each of said heat exchanging devices comprising at least three plate-shaped passageways formed in layers by disposing in opposing relation a plurality of parallel partition walls extending in the direction of liquid flow, the original liquid flowing in one of said three passageways for supply to the distilling chamber which is associated with said heat exchange device, and the distilled liquid resulting from condensation of vapor generated in said distilling chamber and the concentrated liquid drained from said distilling chamber respectively flowing in the other two of said passageways adjacent to said one passageway in a flow direction opposite to the direction of flow of the original liquid through said one passageway.

2. The distillatory apparatus according to claim 1, wherein said distilling chambers comprise a plurality of plate-like members which are respectively disposed with their plate surfaces extending in a vertical direction to form partition walls between said chambers, said distilling chambers being arranged in a lateral direction.

3. The distillatory apparatus according to claim 2, wherein each of said distilling chambers is provided with means for flowing the original liquid in a filmy form substantially all over the partition wall on the side of the adjacent distilling chamber of higher atmospheric pressure.

4. The distillatory apparatus according to claim 1, wherein said distilling chambers are disposed one on another in a vertical direction and the lower partition wall of each distilling chamber forms an original liquid reservoir.

5. The distillatory apparatus according to claim 1, wherein said pressure retaining means comprises a plurality of partly-liquid-containing containers respectively corresponding to said plurality of distilling chambers, the liquid-filled portions of said containers being respectively connected through pipes to the empty portions of the subsequent ones of them; means for applying a reference atmospheric pressure to one of outermost ones of the coupled containers; and pressure control means coupled to the other outermost container, the upper empty portions of said containers being respectively coupled to the distilling chambers corresponding thereto to maintain said distilling chambers under the corresponding atmospheric pressures, and the atmospheric pressure difference between adjacent ones of said containers being selected in accordance with the difference between the level of the liquid surface in each container and the lower end of the pipe attached to said container.

6. The distillatory apparatus according to claim 1, wherein said original liquid supplying means comprises a plurality of containers respectively corresponding to said plurality of distilling chambers and maintained under the same atmospheric pressures as said distilling chambers, each of said containers partly containing said original liquid; the liquid-filled portions of said containers being respectively connected to the empty portions of subsequent ones of said containers through pipes; the liquid-filled portion of each of said containers being connected to an original liquid inlet port of the corresponding one of said distilling chambers; means for supplying the original liquid to the container of the highest atmospheric pressure; and means for draining excess original liquid from the container of the lowest atmospheric pressure.

7. The distillatory apparatus according to claim 1 wherein said distilled liquid draining means comprises a plurality of containers respectively corresponding to said plurality of distilling chambers and maintained under the same atmospheric pressures as said distilling chambers, a plurality of distilled liquid drain pipes extending from said distilling chambers and respectively connected to said containers at their intermediate portion to supply thereto the distilled liquid; the liquid-filled portions of said containers being respectively connected to the empty portions of the subsequent ones of said containers through pipes; said containers being so interconnected to one another that when the distilled liquid in any one of said containers exceeds its predetermined level, the excess distilled liquid flows therefrom into the containers of lower atmospheric pressures one after another and is fully drained out from the container of the lowest atmospheric pressure.

8. The distillatory apparatus according to claim 1, wherein said concentrated liquid draining means comprises a plurality of containers respectively corresponding to said plurality of distilling chambers and maintained under the same atmospheric pressures as said distilling chambers, concentrated liquid drain pipes extending from said distilling chambers are respectively connected to said containers at their intermediate portion to supply thereto the concentrated liquid; the liquid-filled portions of said containers being respectively connected to the empty portions of the subsequent ones of said containers through pipes; said containers being so interconnected to one another that when the concentrated liquid in any one of said containers exceeds its predetermined level, the excess concentrated liquid flows therefrom into the containers of lower atmospheric pressures one after another and is finally drained out from the container of the lowest atmospheric pressure.

9. The apparatus of claim 1 in which said distilling chambers are respectively separated from one another by partition walls each common to adjacent ones of said distilling chambers; vapor generated in each of said distilling chambers being condensed on the partition wall on the side of that one of the distilling chambers adjacent thereto which is held under lower atmospheric pressure; and said partition wall being heated by the heat of condensation of the vapor to heat the original liquid in said distilling chamber of lower atmospheric pressure.

* * * * *